(12) United States Patent
Castinado et al.

(10) Patent No.: US 10,153,983 B2
(45) Date of Patent: Dec. 11, 2018

(54) OPTIMUM RESOURCE ROUTING USING CONTEXTUAL DATA ANALYSIS

(71) Applicant: Bank of America Corporation, Charlotte, NC (US)

(72) Inventors: Joseph Benjamin Castinado, North Glenn, CO (US); Sean Michael Gutman, Waxhaw, NC (US); Phillip Wade Mork, Huntersville, NC (US); Sandeep Kumar Chauhan, Hyderabad (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 259 days.

(21) Appl. No.: 15/343,705

(22) Filed: Nov. 4, 2016

(65) Prior Publication Data
US 2018/0131628 A1 May 10, 2018

(51) Int. Cl.
*G06F 15/173* (2006.01)
*H04L 12/911* (2013.01)
*H04L 29/08* (2006.01)

(52) U.S. Cl.
CPC .............. *H04L 47/70* (2013.01); *H04L 67/10* (2013.01); *H04L 67/306* (2013.01)

(58) Field of Classification Search
USPC ....... 709/203, 206, 217, 219, 223, 224, 226, 709/228, 230, 232, 238; 705/35, 39, 40, 705/42
See application file for complete search history.

(56) References Cited

U.S. PATENT DOCUMENTS

| | | | |
|---|---|---|---|
| 8,001,045 B1 * | 8/2011 | McClinton | G06Q 20/102 705/42 |
| 8,606,705 B2 | 12/2013 | Zanzot et al. | |
| 2002/0023053 A1 | 2/2002 | Szoc et al. | |
| 2003/0140007 A1 | 7/2003 | Kramer et al. | |
| 2003/0208440 A1 | 11/2003 | Harada et al. | |
| 2004/0215560 A1 | 10/2004 | Amalraj et al. | |

(Continued)

FOREIGN PATENT DOCUMENTS

WO 2005081917 A2 9/2005

OTHER PUBLICATIONS

European Patent Office. European Application No. 10 250 245.7-1955. European Office Action dated May 6, 2013. Name of Applicant: Bank of America Corporation. 7 pages.

(Continued)

*Primary Examiner* — Quang N Nguyen
(74) *Attorney, Agent, or Firm* — Michael A. Springs; Moore & Van Allen PLLC; James C. Edwards (57) ABSTRACT

Systems, apparatus are defined that provide for determining optimal resource channels for delivering resources using contextual and prior usage data analysis. As such, the present invention is able to determine and communicate to the resource presenter the optimal resource channel, in which optimal is defined as being most beneficial to the resource presenter and/or resource processor. In this regard, the present invention takes into account the efficiency (i.e., time to process), cost, security, usage, and other benefits associated with the resource presenter and/or resource processor in determining which resource channel is optimal for any given resource delivery event.

18 Claims, 3 Drawing Sheets

(56) References Cited

U.S. PATENT DOCUMENTS

| | | | |
|---|---|---|---|
| 2005/0010524 | A1 | 1/2005 | Gutbrod et al. |
| 2006/0095364 | A1 | 5/2006 | Hamilton et al. |
| 2007/0005498 | A1* | 1/2007 | Cataline ................. G06Q 20/10 705/42 |
| 2007/0061260 | A1 | 3/2007 | deGroeve et al. |
| 2007/0162387 | A1 | 7/2007 | Cataline et al. |
| 2007/0198437 | A1 | 8/2007 | Eisner et al. |
| 2008/0006685 | A1* | 1/2008 | Rackley, III ........... G06Q 20/10 705/35 |
| 2008/0015985 | A1 | 1/2008 | Abhari et al. |
| 2008/0040265 | A1* | 2/2008 | Rackley, III ........... G06Q 20/02 705/40 |
| 2008/0195537 | A1 | 8/2008 | Schulz |
| 2008/0249931 | A1* | 10/2008 | Gilder ..................... G06Q 20/04 705/39 |
| 2008/0290181 | A1 | 11/2008 | Dimitri et al. |
| 2011/0022516 | A1* | 1/2011 | Gao ........................ G06O 20/04 709/206 |
| 2014/0222669 | A1* | 8/2014 | Novak ................... G06Q 20/14 705/40 |

OTHER PUBLICATIONS

European Search Report completed May 27, 2010 for European Application No. EP 10 25 0246.

Extended European Search Report dated Jun. 1, 2010 for European Application No. EP 10 25 0245.

Instituto Mexicano de la Propiedad Industrial. Mexico Office Action dated Apr. 8, 2013. Mexico Application No. MX/a/2010/001717. Name of Applicant: Bank of America Corporation. Spanish Language. 3 pages.

Instituto Mexicano de la Propiedad Industrial. Mexico Office Action dated Apr. 8, 2013. Mexico Application No. MX/a/2010/001717. Name of Applicant: Bank of America Corporation. English Language Summary. 1 page.

Instituto Mexicano de la Propiedad Industrial. Mexico Office Action dated May 29, 2012. Mexico Application No. MX/a/2010/001718. Name of Applicant: Bank of America Corporation. English Language Summary. 1 page.

Instituto Mexicano de la Propiedad Industrial. Mexico Office Action dated May 29, 2012. Mexico Application No. MX/a/2010/001718. Name of Applicant: Bank of America Corporation. Spanish Language. 3 pages.

International Preliminary Report on Patentability dated Aug. 25, 2011 for PCT/US2010/024113.

International Preliminary Report on Patentability dated Aug. 25, 2011 for PCT/US2010/024123.

International Search Report and the Written Opinion of the International Searching Authority dated Apr. 2, 2010 for International Application No. PCT/US2010/24123.

International Search Report and the Written Opinion of the International Searching Authority dated Apr. 12, 2010 for International Application No. PCT/US2010/24113.

* cited by examiner

OPTIMUM RESOURCE ROUTING USING CONTEXTUAL DATA ANALYSIS

FIELD

In general, embodiments herein disclosed relate to resource routing and, more specifically, providing resource channel optimization information using contextual data analysis.

BACKGROUND

A need exists for insuring that the resource channel is optimal for each different resource. The desired systems, apparatus, methods and the like should take into account the resource cost, resource timing and/or resource effectiveness in determining which resource channel is optimal for the user/payor depending upon the circumstances surrounding the resource. Additionally, the desired systems, apparatus, methods and the like should not only provide users/payors recommendations as to optimal resource channels for later-in-time/future resources, but also provide real-time suggestions to users/payors initiating or otherwise contemplating an ensuing resource. Moreover, the desired systems, apparatus, methods and the like should balance the interests of the payor with those of the resource processor to provide the user/payor with one or more optimal payment channel.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

Systems, apparatus, and computer program products are defined that provide for optimizing selection of resource channels for delivering resources using contextual data analysis and historical prior usage data analysis. In this regard the present invention may rely on details surrounding a resource delivery event (e.g., currently ongoing or previously occurred) and cumulative prior usage of the resource channels and/or the resource presenter to determine an optimal resource channel. The resource channel may be optimal to the resource presenter, the resource processor or both entities. In this regard the optimal resource channel may provide the resource presenter and/or the resource processor the best option in terms of efficiency (e.g., processing time), value, security or the like.

A system for determining optimal resource channel(s) for delivering resources defines first embodiments of the invention. The system includes a first computing device that is disposed within a distributed computing network and includes a first memory and at least one first processor in communication with the memory. The system further includes an optimal resource channel determination module that is stored in the first memory and executable by the first processor. The module is configured to receive an electronic signal that indicates a resource delivery event and, in response to receiving the electronic signal, receive contextual information associated with the resource delivery event and analyze the contextual information to determine at least one of a pattern or model associated with the resource. In addition, the module is configured to receive at least one of current resource channel availability or historical usage channel data associated with a plurality of resource channels and a resource provider and determine at least one optimal resource channel from the plurality of resource channels for delivering the resource based at least on the at least one of the pattern or model associated with the resource and the historical usage channel data associated with the plurality of resource channels and a resource provider.

In addition, the system includes a second computing device that is disposed within the distributed computing network and includes a second memory and at least one second processor in communication with the second memory. Further, the system includes an optimal resource channel provider module stored in the second memory executable by the module and configured to provide the at least one optimal resource channel to the resource provider.

In specific embodiments the system further includes a third computing device that is disposed within the distributed computing network and includes a third memory and at least one third processor in communication with the third memory. In such embodiments the system further includes a data analytics module that is stored in the third memory and executable by the third processor. The data analytics module is configured to analyze historical usage channel data associated with the resource provider to determine historical usage patterns associated the resource provider and analyze historical usage channel data associated with the plurality of resource channels to determine historical usage patterns and delivery success rates associated with each of the plurality of resource channels. The module is further configured to provide the historical usage patterns associated the resource provider and the historical usage patterns and delivery success rates associated with each of the plurality of resource channels to the optimal resource channel determination module. In such embodiments of the system, the optimal resource channel determination module utilizes the historical usage patterns associated the resource provider and the historical usage patterns and delivery success rates associated with each of the plurality of resource channels to determine the at least one optimal resource channel from the plurality of resource channels for delivering the resource.

In other specific embodiments of the system, the optimal resource channel determination module is further configured to determine the at least one optimal resource channel, in real-time, prior to completion of resource delivery, while in other embodiments of the system, the optimal resource channel determination module is further configured to determine the at least one optimal resource channel after completion of resource delivery.

In further specific embodiments of the system, the optimal is defined in terms of at least one of efficiency of the plurality of resource channels, cost of the plurality resource channels. In other such embodiments of the system, optimal is determined by balancing interests of the resource provide with interests of the resource processor.

In still further specific embodiments of the system, the optimal resource channel determination module is further configured to determine the at least one optimal resource channel based further on ancillary advantages associated with at least one of the plurality of resource channels.

In still further specific embodiments of the system, the optimal resource channel determination module is further defined as an optimal payment channel determination module that is configured to receive the electronic signal that indicates a payment delivery event. In such embodiments of the system, the optimal payment channel determination module and is configured to receive the contextual information associated with initiation of the payment delivery event, such as, but not limited to, initial or implemented payment channel, payment platform, amount of payment, date and time of payment, and payee. In further related embodiments of the system, the optimal payment channel determination module and is configured to analyze the contextual information to determine at least one of a pattern or model associated with the resource, such that the pattern or model defines at least one of typical payment channel used by the payor to conduct similar payments or type of service or goods associated with the payment. In other elated specific embodiments of the system, the optimal payment channel determination module and is configured to receive the historical usage channel data associated with a plurality of payments channels and a payor and/or current payment account status information associated with one or more payment accounts held by a payor.

In other related specific embodiments of the system, the optimal payment channel determination module and is configured to receive offer information associated with current offers associated with one or more of the payment channels and availability of the current offers to the payor and/or offer information associated with alternative payment mechanisms and determine the optimal payment channel based further on the current and available offers and/or alternative payment mechanisms, such current offers are further defined as at least one of payment processing entity offers and third-party entity offers.

In still further related specific embodiments of the system, the optimal resource channel provider module is further configured as an optimal payment channel widget that is configured to automatically execute in conjunction with the payor accessing electronic commerce (e-commerce) websites. In related embodiments of the system, the optimal payment channel widget is further configured to store payment credentials associated with one or more of the plurality of payment channel and, in response to payor selection of a payment channel, communicate the payment credentials to the e-commerce website. In further specific embodiments of the system, the optimal resource channel provider module is further configured as an optimal payment channel mobile application that is configured to automatically execute on a mobile device based on geographic proximity of the mobile device to a physical location of a merchant or point-of-sale device.

In other related specific embodiments of the system, the optimal payment channel determination module is payor configurable in terms of defining at least one of what is optimal to the payor and what payment parameters prompt the module to determine an optimal payment channel.

An apparatus for determining an optimal resource channel for delivering resources defines second embodiments of the invention. The apparatus includes a computing platform having a memory and at least one processor in communication with the memory. The apparatus further includes an optimal resource channel determination module stored in the memory and executable by the first processor. The module is configured to receive an electronic signal that indicates a resource delivery event associated with delivering a resource, and, in response to receiving the electronic signal, receive contextual information associated with the resource delivery event and analyze the contextual information to determine at least one of a pattern or model associated with the resource. The module is further configured to receive at least one of current resource channel availability or historical usage channel data associated with a plurality of resource channels and a resource provider and determine at least one optimal resource channel from the plurality of resource channels for delivering the resource based at least on the at least one of the pattern or model associated with the resource and the historical usage channel data associated with the plurality of resource channels and a resource provider. Further, the module is configured to communicate the at least one optimal resource channel to the resource provider.

A computer program product comprising a non-transitory computer-readable medium defines third embodiments of the invention. The computer-readable medium includes a first set of codes for causing a computer to receive an electronic signal that indicates a resource delivery event associated with delivering a resource and a second set of codes for causing a computer to, in response to receiving the electronic signal, receive contextual information associated with the resource delivery event. The computer-readable medium additionally includes a third set of codes for causing a computer to analyze the contextual information to determine at least one of a pattern or model associated with the resource. In addition, the computer-readable medium includes a fourth set of codes for causing a computer to receive at least one of current resource channel availability or historical usage channel data associated with a plurality of resource channels and a resource provider and a fifth set of codes for causing a computer to determine at least one optimal resource channel from the plurality of resource channels for delivering the resource based at least on the at least one of the pattern or model associated with the resource and the historical usage channel data associated with the plurality of resource channels and a resource provider. Further, the computer-readable medium includes a sixth set of codes for causing a computer to communicate the at least one optimal resource channel to the resource provider.

Thus, as described in more details below systems, apparatus and computer program are defined that determine optimal resource channels using contextual and prior usage data analysis. As such, the present invention is able to determine and communicate to the resource presenter the optimal resource channel, in which optimal is defined as being most beneficial to the resource presenter and/or resource processor. In this regard, the present invention takes into account the efficiency (i.e., time to process), cost, security, usage, and other benefits associated with the resource presenter and/or resource processor in determining which resource channel is optimal for any given resource delivery event.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Having thus described embodiments of the invention in general terms, reference will now be made to the accompanying drawings, which are not necessarily drawn to scale, and wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Various embodiments or features will be presented in terms of systems that may include a number of devices, components, modules, and the like. It is to be understood and appreciated that the various systems may include additional devices, components, modules, and the like and/or may not include all of the devices, components, modules and the like, discussed in connection with the figures. A combination of these approaches may also be used.

The steps and/or actions of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an Application Specific Integrated Circuit (ASIC). In the alternative, the processor and the storage medium may reside as discrete components in a computing device. Additionally, in some embodiments, the events and/or actions of a method or algorithm may reside as one or any combination or set of codes and/or instructions on a machine-readable medium and/or computer-readable medium, which may be incorporated into a computer program product.

In one or more embodiments, the functions described may be implemented in hardware, software, firmware, or any combination thereof. If implemented in software, the functions may be stored or transmitted as one or more instructions or code on a computer-readable medium. Computer-readable media includes both computer storage media and communication media, including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

Thus, systems and computer program products are defined that provide for determining optimal resource channel(s) for delivering resources using contextual data analysis and historical prior usage data analysis. In this regard the present invention may rely on details surrounding a resource delivery event (e.g., currently ongoing or previously occurred) and cumulative prior usage of the resource channels and/or the resource presenter to determine an optimal resource channel. The resource channel may be optimal to the resource presenter, the resource processor or both entities. In this regard the optimal resource channel may provide the resource presenter and/or the resource processor the best option in terms of efficiency (e.g., processing time), value, security or the like.

Figure 1:
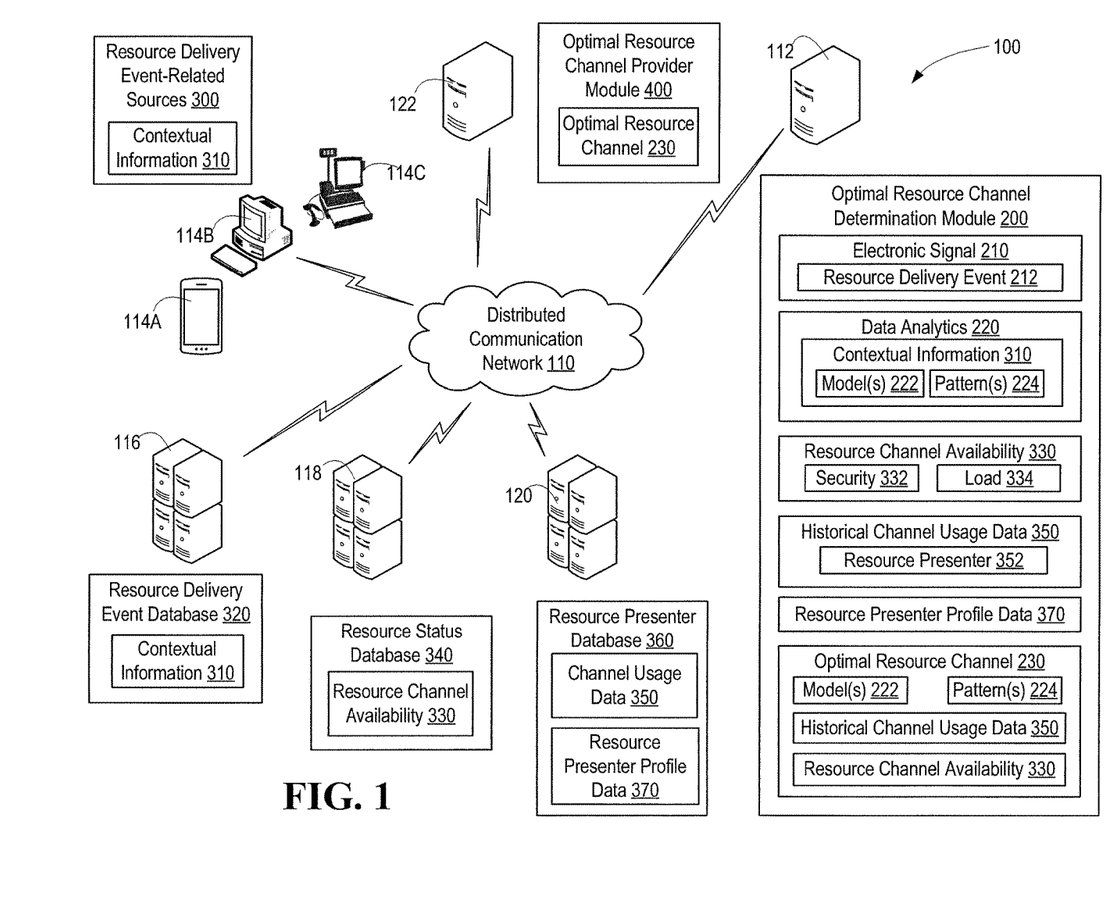
FIG. 1 is a schematic diagram of a system for determining an optimal resource channel for delivering resources, in accordance with embodiments of the present invention.

Referring to FIG. 1 a block diagram is provided of a system 100 for determining optimal resource channels for delivering resources, in accordance with embodiments of the present invention. The system 100 is implemented throughout a distributed computing network 110, which may comprise the Internet, one or more intranets or a combination thereof. The system includes an apparatus 112, which may comprise a server or any other computing device configured to execute optimal resource channel determination module 200. The module 200 is configured to determine one or more optimal resource channels for delivering resources. Optimal may be defined in terms of the needs of the resource presenter and/or the resource processor. In this regard, the optimal resource channel may balance the needs of the resource presenter and the resource processor. The needs or concerns of the resource presenter may include, but are not limited to, efficiency (i.e., time required to perform the resource delivery), reliability, cost, benefits, security and the like. The needs or concerns of the resource processor may include, but are not limited to, cost, efficiency, reliability, promotion/demotion of a resource channel, security and the like. The module 200 is configured to determine optimal resource channels on a resource delivery event basis and, as such, what is optimal for one specific resource delivery event may differ as to other specific resource delivery events.

The module 200 is configured to receive an electronic signal 210 (i.e., input) that indicates a resource delivery event 212 associated with delivering resources. The resource delivery event 212 may be a contemplated or foreseen resource delivery event, a currently ongoing in-progress resource delivery event or a previous completed resource delivery event. In the event, that the resource delivery event is a previously completed event, the determined optimal resource channel may be applied to future similar or same resource delivery events. As such, the electronic signal 210 may be received from a resource delivery event-related source 300, such a mobile device 114A, computing device 114B or transaction system 114C, or resource delivery event database 320, stored in server 116 or any other suitable networked device.

Module 200 is further configured to receive contextual information 310 related to the resource delivery event 212. Contextual information 310 may include any information relevant to the resource delivery event, including, but not limited to, the date/time of the resource delivery event, the initiated or implemented resource channel, the resource delivery platform and/or location, the amount of resources, the resource recipient, the purpose of the resource delivery event and the like. As such, the contextual information may be received from any networked entity including, but not limited to, resource delivery event-related source 300, such a mobile device 114A, computing device 114B or transaction system 114C, or resource delivery event database 320 or the like.

Further, module 200 is configured to apply data analytics 220 to the contextual information 310 to determine one or more of a model 222 or pattern 224 associated with the resource delivery event 212. While data analytics 220 is shown as included within module 200, in other embodiments of the invention, data analytics 220 may reside in a separate module/application (and be executed at another network entity/device) that is in communication with module 200. In specific embodiments of the invention, in which the resource delivery event is either a contemplated/foreseen event or an ongoing, in-progress event, data analytics 220 may provide for real-time data analysis, such that the optimal resource channels are determined in real-time or near real-time (i.e., prior to the completion of the resource delivery event, so that the determined optimal resource channel may be implemented in the contemplated/foreseen or ongoing resource delivery event. The determined model 222 and or pattern 224 allows for the resource delivery event to be categorized for the purpose of subsequent optimal resource channel determination.

Additionally, module 200 is configured to receive other information relevant to determination of the optimal resource channel. Such other information may be associated with the resource channels, the resource presenter and/or the resource processor. In specific embodiments of the system, the module 200 is configured to receive, from resource status database or the like stored in network device 118, current resource channel availability 330 information. The resource channel availability 330 information may include, but is not limited to security information 332 (e.g., security classification of payment channels and/or current security limitations associated with specific payment channels or the like) and load 334 information (e.g., the current load (i.e., volume of resource delivery events) on each of the resource channels and/or the historical load placed on each of the resource channels). In other specific embodiments of the system, the module 200 is configured to receive, from resource presenter database 360 or the like stored in network device 120, historical channel usage data 350 associated with the resource presenter 352 and/or resource presenter profile information 370. The historical channel usage data 350 may indicate which resource channels have been used in the past by the resource presenter 352 and the types of resource delivery events 212 that the resource channels have been used for. The resource presenter profile information 370 may include, but is not limited to, resource presenter 352 settings/ configurations associated with the module 200, such as, but not limited to, resource channel preferences (which may be resource delivery event-type specific) and/or triggers for determination of optimal resource channels (e.g., resource delivery event parameters, for example, amount of resources, type/purpose of the resource delivery event which trigger determination and, subsequent notification, of optimal resource channel(s)).

In other embodiments of the system, a separate data analytics module (not shown in FIG. 1), which may implemented at apparatus 112 or at another network entity/apparatus, may be employed to analyze the historical channel data usage data 350 associated with the resource presenter 352 and/or historical channel usage data associated with the resource processor to determine historical resource channel usage patterns associated with either the resource presenter or the resource processor. Further, the separate data analytics module may be configured to analyze historical usage channel data associated with the resource channels to determine historical usage patterns of the channels and/or success/failure rates associated with each of the resource channels. Such information determined by the separate data analytics module may be communicated to the optimal resource channel determination module 200 and used as a basis for determining optimal resource channels.

Optimal resource channel determination module 200 is further configured to determine one or more optimal resource channels 230 for the resource delivery event 212 based on the contextual information 310 (i.e., models 222 and patterns 224 and the like), the resource availability 330 information, the historical channel usage data 350, and/or the resource presenter profile data 370 and any other relevant information associated with the resource delivery event, the resource channels, the resource presenter and/or the resource processor.

System 100 additionally includes optimal resource channel provider module 400 that is configured to communicate the determined optimal resource channel 233 to the resource presenter 252. In specific embodiments of the invention, the optimal resource channel provider module 400 may be configured to generate and initiate communication of alerts or other forms of notification to the resource presenter 352. For example, alerts or notifications may take the form of text/SMS (Short Message Service) messages, email or messages/banners inserted or otherwise presented in a related online and/or mobile application. While FIG. 1, depicts optimal resource channel provider module 400 being executed on network device 122 in other embodiments of the invention, optimal resource channel provider module 400 may be executed on apparatus/network device 112 or the like.

Figure 2:
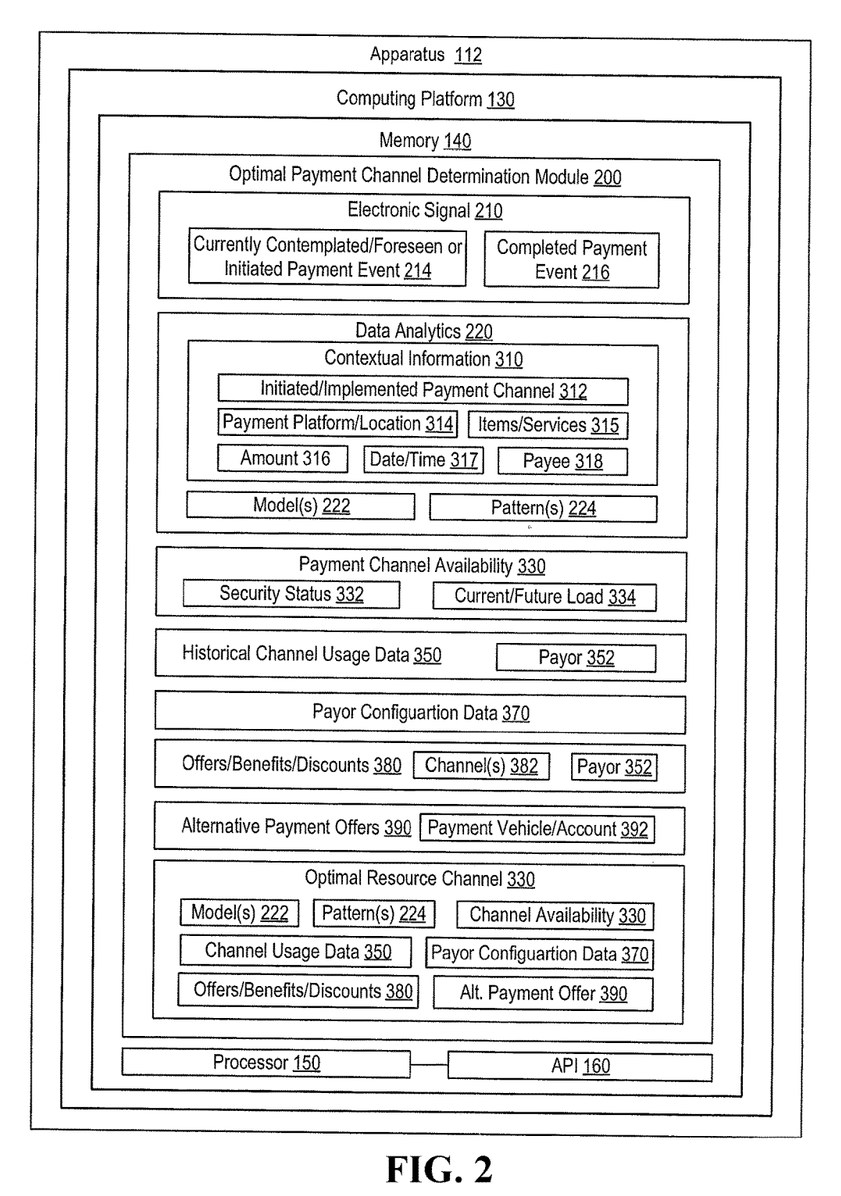
FIG. 2 is a block diagram of an apparatus configured for determining an optimal payment channel for delivering a payment, in accordance with embodiments of the present invention.

Referring to FIG. 2, a block diagram is depicted of an apparatus 112 configured for determining optimal resource channel(s) for delivering resources, in accordance with embodiments of the present invention. Specifically, FIG. 2 depicts embodiments of the invention in which the optimal resource channel determination module 200 is further defined as an optimal payment channel determination module 200 that is configured to determine one or more optimal payment channels for making a payment (i.e., a resource delivery event). Payment channels as used herein are the vehicles/rails used by payor to make monetary payment or otherwise transfer funds to a payee. Such payment channels may include, but are not limited to credit card, debit card, cash payment, check presentation, digital wallet, ecommerce wallet, net-banking, Near Field Communication (NFC) payment, cloud payment, person-to-person (P2P) payment, consumer-to-business (C2B) payment, wire payment, bitcoin/blockchain and the like. Each of the payment channels may have one or more associated settlement processes which may affect the timing for settlement/payment of the payee, cost of settlement/transaction, security-related to the settlement process and the like. Each of the payment channels may vary in terms of the efficiency of settlement (i.e., time to settle), cost of the payment transaction, security associated with the payment channel, benefits (offers, rebates and the like) associated with the payment channel, reliability (i.e., success rate in completing the transaction and/or the settlement) and the like.

The apparatus 112 includes a computing platform 130 having one or more processors 150 and a memory 140 in communication with the processor(s) 150. The memory 140 may comprise volatile and non-volatile memory, such as read-only and/or random-access memory (RAM and ROM), EPROM, EEPROM, flash cards, cloud memory or any memory common to computing platforms. Further, memory 140 may include one or more flash memory cells, or may be any secondary or tertiary storage device, such as magnetic media, optical media, tape, or soft or hard disk.

Further, computing platform 130 also includes processor 150, which may be an application-specific integrated circuit ("ASIC"), or other chipset, processor, logic circuit, or other data processing device. Processor 150 or another processor such as ASIC may execute an Application Programming Interface (API) 160 that interfaces with any resident programs, such as optimal payment channel determination module 200 or the like stored in the memory 140 of the apparatus 112.

Processor 150 may include various processing subsystems (not shown in FIG. 2) embodied in hardware, firmware, software, and combinations thereof that enable the functionality of apparatus 112 and the operability of the apparatus 30 on distributed computing network 110 (shown in FIG. 1). For example, processing subsystems allow for initiating and maintaining communications and exchanging data with other devices in the network. For the disclosed aspects, processing subsystems of processor 104 may include any subsystem used in conjunction with optimal payment channel determination module 200 or subcomponents or submodules thereof.

Computing platform 130 may additionally include a communications module (not shown in FIG. 2) operable for initiating and maintaining communication, wired or wireless, between the apparatus 112 and network entities/apparatus, such as the servers, network devices/entities shown and described in relation to FIG. 1.

The memory 140 of apparatus 112 includes optimal payment channel determination module 200 that is configured to determine one or more optimal payment channels for a payment event, in accordance with embodiments of the invention. As such, module 200 is configured to receive an electronic signal 210 (i.e., input) that indicates a currently contemplated/foreseen or currently ongoing in-progress payment event 214 or a previous completed payment event 216.

The electronic signal may indicate the payor's presence at an online or conventional brick-and-mortar merchant (i.e., a contemplated/foreseen payment event 214). For example, the payor may visit an online merchant site and, in response, the module 200 may receive an electronic signal 210 indicating the payor's presence on the website. In another example, location-determining mechanisms (Global positioning System (GPS) or the like) within a payor's mobile device may indicate that a payor is physically located at or within the vicinity of a merchant and, in response, the electronic signal 210 may be communicated to the module 200.

In other embodiments of the invention, the point-of-sale (POS) system, check approval system or any other electronic system implemented in a payment transaction may be configured to send the electronic signal 210 to the module 200 once the payor initiates a transaction (i.e., a currently ongoing in-progress payment event 214), either online or at a brick-and-mortar merchant.

In still further embodiments of the invention, the electronic signal 210 may be received from a transaction database, such as a financial institution transaction database, and indicate a completed payment event 216. It should be noted that determination of optimal payment channels for payment events that do not implicate the distributed computing network (e.g., cash payment or the like) may be limited to completed payment events 216. In the event, that the payment event is a previously completed payment event, the determined optimal payment channel may be applied, by the payor, to future similar or same payment events.

Module 200 is further configured to receive contextual information 310 related to the payment event. Contextual information 310 may include any information relevant to the payment event, including, but not limited to, the proximate date/time of the payment event 317, the initiated or implemented payment channel 312, the payment delivery platform (online, mobile, brick and mortar) and/or location (website address, physical address) 314, the payment amount 316, the payee (merchant or the like) 318, the items or services 315 associated with the payment event and the like. It should be noted that the amount of contextual information 310 will vary depending on the stage of the payment event, in other words, completed payment events will have the highest amount of contextual information 310 while contemplated/foreseen payment events will have the least amount of contextual information 310. As previously noted, the contextual information 310 may be received from any networked entity including, but not limited to, payment event-related sources, such as a payor's mobile device or computing device, a payment transaction authorizing system or, in the instance in which the payment event is a completed event, from a transaction database.

Further, module 200 is configured to apply data analytics 220 to the contextual information 310 to determine one or more of model(s) 222 or pattern(s) 224 associated with the payment event 212. It should be noted that while data analytics 220 is shown as included within module 200, in other embodiments of the invention, data analytics 220 may reside in a separate module/application that is in communication with module 200. In such embodiments of the invention, the contextual information 310 itself is not received by the module 200 but, rather, the results of the data analytics (models 222, patterns 224 or the like) are received by the module 200. The determined model 222 and or pattern 224 allows for the payment event to be categorized for the purpose of subsequent optimal payment channel determination.

In specific embodiments of the invention, in which the payment event is either a contemplated/foreseen payment event or an ongoing, in-progress payment event, data analytics 220 may provide for real-time data analysis, such that the optimal payment channels are determined in real-time or near real-time (i.e., prior to the completion of the payment event, so that the determined optimal payment channel may conceivably be selected by the payor and implemented in the contemplated/foreseen or ongoing payment event. The determined model 222 and or pattern 224 allows for the payment event to be categorized for the purpose of subsequent optimal payment channel determination.

Additionally, module 200 is configured to receive other information relevant to determination of the optimal payment channel. Such other information may be associated with the payment channels, the payor and/or the payment processor. In specific embodiments of the system, the module 200 is configured to receive current payment channel availability 330 information. The payment availability 330 information may include, but is not limited to security status information 332 (e.g., security classification of payment channels and/or current security threats/breaches or the like associated with specific payment channels) and load information 334 (e.g., the current load (i.e., volume of payment events) on each of the payment channels and/or the historical load placed on each of the payment channels). Security status information 332 and or load information 334 may be instrumental in determining an optimal payment channel that attempts to steer a payor away from payment channels that either have current security concerns or currently or historically have experienced heavy loads and steer the payor towards payment channels that either do not have current security concerns or currently or historically have experienced lower loads.

In other specific embodiments of the system, the module 200 is configured to receive historical channel usage data 350 associated with the payor 352. The historical channel usage data 350 may indicate which payment channels have been used in the past by the payor 352 and the types of payment events that the payment channels have been used for. For example, historical usage channel data 350 shows that a payee always uses a certain payment channel for purchasing groceries and a different payment channel for purchasing fuel.

Further, the module may be configured to receive payor configuration/profile information 370 which may include, but is not limited to, payor settings/configurations associated with the module 200, such as, but not limited to, payment preferences (which may be payment event-type specific) and/or triggers for determination of optimal payment channels (e.g., payment event parameters, for example, payment amount, items/services associated with payment event and the like which trigger determination and, subsequent notification, of optimal payment channel(s)). In this regard, a payor may configure the system such that certain payment events do not trigger determination and, thus, notification of optimal payment channels due to the payor's preference to use a specific payment channel for a specific type of payment event or other preset parameters related to payment events.

In other embodiments of the system, a separate data analytics module (not shown in FIG. 2), may be employed to analyze the historical payment channel data usage data 350 associated with the payor 352 and/or historical channel usage data associated with the payment processor to determine historical payment channel usage patterns associated with either the payor and/or payment processor. Further, such a data analytics module may be configured to analyze the historical usage channel data associated with the payment channels to determine historical usage patterns of the payment channels and/or success/failure rates associated with each of the payment channels. Such information may be communicated to the optimal payment channel determination module 200 and used as a basis for determining optimal payment channels.

In addition, module 200 may be configured to receive offer/benefit/discount information 380 associated with the payment channels 382, which are currently available to the payor 352. The offers/benefits/discounts may include, but are not limited to, cash-back/rebates discounts for using a specific payment channel, points/rewards for using a specific payment channel, extended warranty/insurance coverage for the services or items purchased using the payment channel and the like. In this regard, the offers/benefits/discounts may be highly beneficial in determining the overall cost associated with using a particular payment channel. In addition, since offers/benefits/discounts are typically temporal (i.e., may only be applicable for a prescribed period of time), the payor highly benefits from being notified/alerted of such offers/benefits/discounts, specifically, in instances in which a payment event is contemplated or currently ongoing. In addition, such offers/benefits/discounts may not only be payment channel-specific but also may be payor-specific (i.e., only applicable to specific payors and/or for designated time periods).

Further, module 200 may be configured to receive alternative payment offers 390 for conducting the contemplated/foreseen or currently ongoing payment event or for conducting future payment events. The alternative payment offers 390 which may comprise payment vehicles/accounts 392, such as credit accounts, loan accounts and the like offered by the system operator (e.g., financial institution) takes into the account that the system operator may have knowledge, via the contextual data, of the purchase amount and/or items/services being purchased and have access to the payor's current account information, such as account balances and the like to determine if a contemplated or ongoing purchase event will be detrimental to an account balance, such that an alternative payment offer 390 (i.e., opening a new credit/loan account or the like) would be advantageous to the payor. In specific embodiments of the invention, the user/payor may configure the system, such that, in the event that an alternative payment offer is available the alternative payment offer is automatically (without tacit approval of the payor) accepted if predefined payor-configured criteria is met and the payment channel associated with the alternative payment offer is subsequently applied to the contemplated/foreseen or currently ongoing payment event.

In response to receiving the aforementioned information/data the optimal payment channel determination module 200 is further configured to determine one or more optimal payment channels 330 for the payment event based on the contextual information 310 (i.e., models 222 and patterns 224 and the like), the channel availability 330 information, the historical channel usage data 350, the resource presenter configuration data 370, the offers/discounts/benefits 380 available to the payor and/or the alternative payment offers 390 and any other relevant information associated with the payment event, the payment channels, the payor and/or the payment processor.

Figure 3:
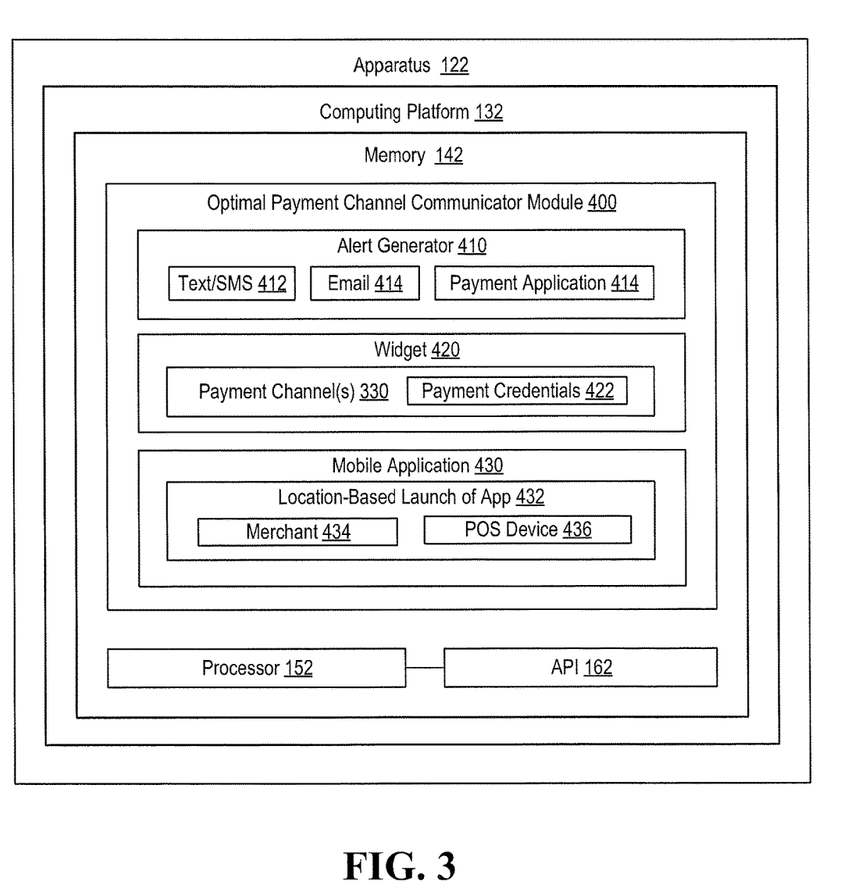
FIG. 3 is a block diagram of an apparatus configured to provide communication of the determined optimal resource channel to the resource presenter, in accordance with embodiments of the present invention.

Referring to FIG. 3, a block diagram is depicted of apparatus 122 configured for providing payors notification of the determined optimal payment channel, in accordance with embodiments of the present invention. The apparatus includes a computing platform 132 having one or more processors 152 and a memory 142 in communication with the processor(s) 152. The memory 142 may comprise volatile and non-volatile memory, such as read-only and/or random-access memory (RAM and ROM), EPROM, EEPROM, flash cards, or any memory common to computer platforms. Further, memory 142 may include one or more flash memory cells, or may be any secondary or tertiary storage device, such as magnetic media, optical media, tape, or soft or hard disk.

Further, computing platform 132 also includes processor 152, which may be an application-specific integrated circuit ("ASIC"), or other chipset, processor, logic circuit, or other data processing device. Processor 152 or another processor such as ASIC may execute an application programming interface ("API") 162 that interfaces with any resident programs, such as optimal payment channel communicator module 400 or the like stored in the memory 142 of the apparatus 122.

The memory 142 of apparatus 122 stores optimal payment channel communication module 400 that is configured to provide notification to a payor of the determined optimal payment channel(s), in accordance with embodiments of the present invention. In specific embodiments of the invention, the module 400 takes the form of an alert generator 410 that is configured to generate and initiate communication of alerts that notify the payor of the determined optimal payment channels and, in some embodiments, provide for notification of the offers/benefits and the like associated with the optimal payment channel(s). Additionally, the alert may be configured to include alternative payment offers, such as offers for credit accounts, loans or the like. The alerts may take the form of text/SMS (Short Message Service) messages 412, emails 414 or banners/messages included in payment-related online or mobile applications (e.g., online or mobile banking applications or the like). In instances in which the optimal payment channel is determined in real-time for a contemplated/foreseen or currently ongoing payment, text/SMS messages 412 may be the preferred form of the alerts to insure that the payor receives and considers the optimal payment channels prior to completion of the payment event. In other instances in which the payment event has already been completed, an email or banner/message with the online/mobile application may be sufficient.

In other embodiments of the invention, module 200 may take the form of a widget 420 that is configured to be executed and displayed when the user/payor visits an online merchant. In specific embodiments of the invention, the widget is configured to display the optimal payment channel(s) 330 within widget 420. It should be noted that the optimal payment channel 330 may change during a payor's visit to a merchant's website as more contextual information is acquired during the visit. For example, as the user/payor adds more items/services to their shopping cart, contextual information in the form of anticipated payment amount and types of products/services associated with the payment item may be received and utilized by the optimal payment channel determination module 200 and such information may influence the determination process.

In addition, the widget 420 may be configured to store payment credentials 422 associated with the various different payment channels (e.g., credit/debit card account credentials, digital wallet credentials and the like) and, once the payor authorizes payment via a chosen payment channel, automatically communicate the payment credentials 422 to the online merchant. Such storage and automatic communication of payment credentials adds a security aspect to the widget 350, in that, the payment credentials are not required to be stored at the online merchant site nor inputted by the payor at the time of the payment event.

In other embodiments of the invention, the module 400 may take the form of a mobile application 430 or be included with a mobile application, such as a mobile banking application or the like. In specific embodiments, the application 430 may be configured to include location-based automated launch of the application 432 for the purpose of displaying or otherwise notifying (e.g., audible signal) the user/payor of the optimal payment channels. For example, the application may automatically launch when the user/payor is located at or proximate to a merchant 432 or a point-of-sale device 434. In specific embodiments, a user/payor may configure which merchants or which merchant-types are associated with the automated launch of the application and display of the optimal payment channel alerts/notifications.

In other embodiments of the invention, a user/payor may configure the system such that the determined optimal payment channel is automatically applied to payment events. In such embodiments of the invention, the automatic use of the optimal payment channel may override or otherwise circumvent the actual payment channel that is used by the payor at the time of the payment event. In such embodiments the user may pre-designate certain payment event-types for automatic use of the optimal payment channel or may set other criteria/thresholds for automatic use of the optimal payment channel (e.g., payment account balance associated with a particular payment channel falls below a preconfigured limit or the like). In such embodiments of the invention, the payor may be notified/alerted that an optimal payment channel has been determined and automatically will be applied to a contemplated/foreseen, ongoing or completed payment event, absent an indication from the payor otherwise (i.e., the notification/alert is configured to allow for the user to opt-out of the automatic use of the optimal payment channel).

Thus, as described in above, devices, methods and computer program are defined that determine optimal resource channels for delivering resources using contextual and prior usage data analysis. As such, the present invention is able to determine and communicate to the resource presenter the optimal resource channel, in which optimal is defined as being most beneficial to the resource presenter and/or resource processor. In this regard, the present invention takes into account the efficiency (i.e., time to process), cost, security, usage, and other benefits associated with the resource presenter and/or resource processor in determining which resource channel is optimal for any given resource delivery event.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for determining optimal resource channels for delivering resources, the system comprising:
a first computing device disposed within a distributed computing network and including a first memory, and at least one first processor in communication with the first memory;
an optimal resource channel determination module stored in the first memory, executable by the first processor and configured to:
receive an electronic signal that indicates a resource delivery event associated with delivering a resource,
in response to receiving the electronic signal, receive contextual information associated with the resource delivery event,
analyze the contextual information to determine at least one of a pattern or model associated with the resource,
receive at least one of (i) current resource channel availability, or (ii) historical channel usage data associated with a resource provider, and
determine at least one optimal resource channel from the plurality of resource channels for delivering the resource based at least on (i) the at least one of the pattern or the model associated with the resource and (ii) at least one of the historical usage channel data associated with the resource provider or the current resource channel availability;
a second computing device disposed within the distributed computing network including a second memory and at least one second processor in communication with the second memory; and
an optimal resource channel provider module stored in the second memory executable by the second processor and configured to provide the at least one optimal resource channel to the resource provider;
wherein the optimal resource channel determination module is further defined as an optimal payment channel determination module and is configured to receive the electronic signal that indicates a payment delivery event;
wherein the optimal payment channel determination module and is configured to receive offer information associated with current offers associated with at least one of the payment channels and availability of the current offers to the payor and determine an optimal payment channel based further on the current and available offers, wherein the current offers are further defined as at least one of payment processing entity offers and third-party entity offers.

2. The system of claim 1, further comprising a third computing device disposed within the distributed computing network including a third memory and at least one third processor in communication with the third memory; and
a data analytics module stored in the third memory, executable by the third processor and configured to:
analyze historical usage channel data associated with the resource provider to determine historical usage patterns associated the resource provider;
analyze historical usage channel data associated with the plurality of resource channels to determine historical usage patterns and delivery success rates associated with each of the plurality of resource channels; and
provide the historical usage patterns associated the resource provider and the historical usage patterns and delivery success rates associated with each of the plurality of resource channels to the optimal resource channel determination module,
wherein the optimal resource channel determination module utilizes the historical usage patterns associated the resource provider and the historical usage patterns and delivery success rates associated with each of the plurality of resource channels to determine the at least one optimal resource channel from the plurality of resource channels for delivering the resource.

3. The system of claim 1, wherein the optimal resource channel determination module is further configured to determine the at least one optimal resource channel, in real-time, prior to completion of the resource delivery event.

4. The system of claim 1, wherein the optimal resource channel determination module is further configured to determine the at least one optimal resource channel after completion of the resource delivery event.

5. The system of claim 1, wherein the optimal resource channel determination module is further configured to determine the at least one optimal resource channel, wherein optimal is defined in terms of at least one of efficiency of the plurality of resource channels, cost of the plurality of resource channels.

6. The system of claim 1, wherein the optimal resource channel determination module is further configured to determine the at least one optimal resource channel, wherein optimal is determined by balancing interests of the resource provider with interests of a resource processor.

7. The system of claim 1, wherein the optimal resource channel determination module is further configured to determine the at least one optimal resource channel based further on ancillary advantages associated with at least one of the plurality of resource channels.

8. The system of claim 1, wherein the optimal payment channel determination module and is configured to receive the contextual information associated with the payment delivery event, wherein the contextual information comprises initial or implemented payment channel, payment platform, amount of payment, date and time of payment, and payee.

9. The system of claim 1, wherein the optimal payment channel determination module and is configured to analyze the contextual information to determine at least one of a pattern or model associated with the resource, wherein the pattern or model defines at least one of typical payment channel used by a payor to conduct similar payments or type of service or goods associated with the payment.

10. The system of claim 1, wherein the optimal payment channel determination module and is configured to receive historical payment channel usage data associated with a payor.

11. The system of claim 1, wherein the optimal payment channel determination module and is configured to receive current payment account status information associated with one or more payment accounts held by a payor.

12. The system of claim 1, wherein the optimal payment channel determination module and is configured to receive offer information associated with alternative payment mechanisms.

13. The system of claim 1, the optimal resource channel provider module is further configured as an optimal payment channel widget that is configured to automatically execute in conjunction with a payor accessing electronic commerce (e-commerce) websites.

14. The system of claim 13, wherein the optimal payment channel widget is further configured to store payment credentials associated with one or more of the plurality of payment channel and, in response to payor selection of a payment channel, communicate the payment credentials to the e-commerce website.

15. The system of claim 1, wherein the optimal resource channel provider module is further configured as an optimal payment channel mobile application that is configured to automatically execute on a mobile device based on geographic proximity of the mobile device to a physical location of a merchant or a point-of-sale device.

16. The system of claim 1, wherein the optimal payment channel determination module is payor configurable in terms of defining at least one of what is optimal to the payor and what payment parameters prompt the module to determine an optimal payment channel.

17. An apparatus for determining optimal resource channel for delivering resources, the apparatus comprising:
 a computing platform including a memory, and at least one processor in communication with the memory; and
 an optimal resource channel determination module stored in the memory, executable by the processor and configured to:
  receive an electronic signal that indicates a resource delivery event associated with delivering a resource,
  in response to receiving the electronic signal, receive contextual information associated with the resource delivery event,
  analyze the contextual information to determine at least one of a pattern or model associated with the resource,
  receive at least one of (1) current resource channel availability or (ii) historical channel usage data associated with a resource provider, and
  determine at least one optimal resource channel from the plurality of resource channels for delivering the resource based at least on (i) the at least one of the pattern or the model associated with the resource and (ii) at least one of the historical usage channel data associated with the resource provider or the current resource channel availability; and
  communicate the at least one optimal resource channel to the resource provider;
 wherein the optimal resource channel determination module is further defined as an optimal payment channel determination module and is configured to receive the electronic signal that indicates a payment delivery event;
 wherein the optimal payment channel determination module and is configured to receive offer information associated with current offers associated with at least one of the payment channels and availability of the current offers to the payor and determine an optimal payment channel based further on the current and available offers, wherein the current offers are further defined as at least one of payment processing entity offers and third-party entity offers.

18. A computer program product comprising a non-transitory computer-readable medium comprising:
 a first set of codes for causing a computer to receive an electronic signal that indicates a resource delivery event associated with delivering a resource;
 a second set of codes for causing a computer to, in response to receiving the electronic signal, receive contextual information associated with the resource delivery event;
 a third set of codes for causing a computer to analyze the contextual information to determine at least one of a pattern or model associated with the resource;
 a fourth set of codes for causing a computer to receive at least one of (i) current resource channel availability or (ii) historical channel usage data associated with a resource provider;
 a fifth set of codes for causing a computer to determine at least one optimal resource channel from the plurality of resource channels for delivering the resource based at least on (i) the at least one of the pattern or the model associated with the resource and (ii) at least one of the historical usage channel data associated with the resource provider or the current resource channel availability;
 a sixth set of codes for causing a computer to communicate the at least one optimal resource channel to the resource provider;
 a seventh set of codes for causing a computer to receive the electronic signal that indicates a payment delivery event; and
 an eighth set of codes for causing a computer to receive offer information associated with current offers associated with at least one of the payment channels and availability of the current offers to the payor and determine an optimal payment channel based further on the current and available offers, wherein the current offers are further defined as at least one of payment processing entity offers and third-party entity offers.

\* \* \* \* \*